Figure 1:
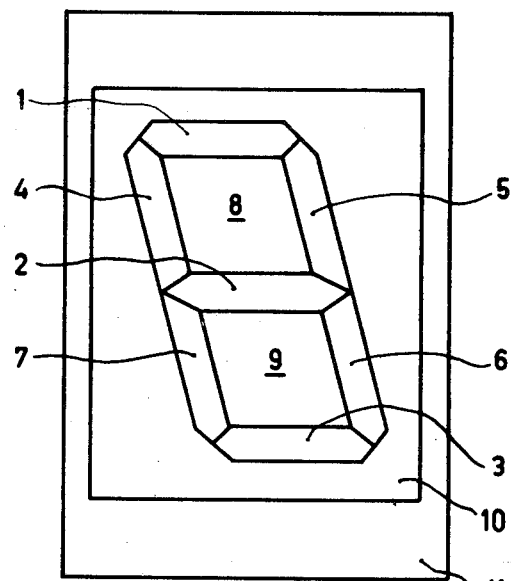

United States Patent [19]
Ponjee et al.

[11] 3,912,368
[45] Oct. 14, 1975

[54] IMAGE DISPLAY CELL

[75] Inventors: Johannes Jacobus Ponjee; Hendrik Tjapko Van Dam; Cornelis Johannes Schoot, all of Emmasingel, Eindhoven, Netherlands

[73] Assignee: U.S. Philips Corporation, New York, N.Y.

[22] Filed: May 2, 1974

[21] Appl. No.: 466,389

[30] Foreign Application Priority Data
May 4, 1973  Netherlands ........................ 7306209

[52] U.S. Cl. ......... 350/160 R; 204/242; 204/224 R; 340/324 R; 340/378 R; 340/336; 340/173; 260/293.87; 260/243
[51] Int. Cl.² ......................... G02F 1/01; G09F 9/00; C07D 279/00
[58] Field of Search ..... 204/242, 224 R; 350/160 R; 340/324 R, 378 R, 336 CK, 173 R

[56] References Cited
UNITED STATES PATENTS

| | | | |
|---|---|---|---|
| 3,017,612 | 1/1962 | Singer .......................... | 204/242 UX |
| 3,096,271 | 7/1963 | Hespenheide .............. | 204/224 R X |
| 3,123,806 | 3/1964 | Alburger ..................... | 204/242 UX |
| 3,451,741 | 6/1969 | Manos ........................... | 350/160 R |
| 3,712,709 | 1/1973 | Kenworthy ..................... | 350/160 R |
| 3,806,229 | 4/1974 | Schoot et al. .................... | 350/160 R |

*Primary Examiner*—John H. Mack
*Assistant Examiner*—Aaron Weisstuch
*Attorney, Agent, or Firm*—Frank R. Trifari; Norman N. Spain

[57] ABSTRACT

The invention relates to an image display cell which forms an image which persists even if current no longer flows through the cell.

The cell has at least two electrodes which are in contact with a cell liquid in which a colourless viologen salt (formula I) is dissolved. When a potential difference of at least 1.5 volts is applied across the electrodes the said salt is reduced to a coloured indissoluble compound which adheres to the cathode, thus colouring it and forming an image. At the anode, bromide is oxidized to bromine which complexes with a quarternary ammonium ion and precipitates on the anode.

6 Claims, 5 Drawing Figures

IMAGE DISPLAY CELL

The invention relates to an image display cell having a transparent wall part and provided with an aqueous solution of a N,N'-disubstituted-4,4'-bipyridinium salt as a reversibly reducible redox substance and a halide as a reversibly oxidizable redox substance, which solution is in contact with at least two inert electrodes.

Such a cell when used as an indicator is described in Chemical Abstracts 74, 48964x (1971). In this cell, N,N'-dimethyl-4,4'-bipyridiniumdichloride is used as the reversibly reducible substance and potassium chloride as the reversible oxidizable substance. If a voltage higher than a threshold value is applied across the electrodes, the bipyridinium ion is converted at the cathode into a blue-coloured radical ion which colours the electrode surface and thus produces an image. Simultaneously, chloride is converted into chlorine at the anode.

The known cell when used as an image display cell has the disadvantage that the blue-coloured radical ion is dissolved in the medium and hence diffuses away from the electrode. As a result, contrast of the image is reduced. Furthermore the chlorine produced at the anode is dissolved in the medium and by diffusion comes into contact with the blue-coloured radical ion, causing the latter to be converted to its leuco-form. Although this chemical reaction can be counteracted by incorporating a diaphragm between the cathode and anode spaces of the cell, diffusion of the blue-coloured radical ion from the cathode to the medium of the cathode space cannot be prevented, with a resulting loss in contrast of the image. The properties of the cell further require a potential difference greater than the threshold value to be maintained across the electrodes as long as an image is to be maintained.

Netherlands Pat. application No. 7,009,521 (PHN.4964) laid open to public inspection, also describes an image display cell in which N,N'-disubstituted-4,4'-bipyridinium compounds are used. In this cell the reversibly oxidizable sustances are either tetrachlorohydroquinone or ferrous salts. This cell has the same disadvantages as the above-described one.

Pre-published German Pat. application No. 2,043,562 describes an optical light filter in which N,N'-disubstituted-4,4'-bipyridinium compounds are used. In many cases the bipyridinium compounds used produce soluble radical cation salts which diffuse away from the cathode. All the oxidation products formed at the anode are soluble in the medium. Maintaining an obtained optical density of the filter consequently requires an electric current flow such that the loss of coloured compound due to oxidation is compensated for by the products formed at the anode. When the filter is used as an image display cell it moreover suffers from the disadvantage that the contrast of the image decreases in all the cases in which the coloured substance is not insoluble in the medium.

It is an object of the present invention to provide an image display cell in which the image is maintained even if no current flows through the cell.

Netherlands Pat. application No. 7,116,637 laid open to public inspection describes a cell in which N,N'-di-(p-cyanophenyl)-4,4'-bipyridiniumchloride is used as the reversibly reducible substance. In this cell the chloride ion which precipitates at the silver anode in the form of AgCl acts as the reversible oxidizable component. The application as an alternative mentions the use of the bipyridinium radical cation chloride as the reversibly oxidizable substance. In the latter case, prior to assembly of the cell the anode is electrolytically coated with the said radial cation, which means an additional complication of cell manufacture.

Although the cell according to the latter patent application satisfies the requirement that the image should be maintained in the absence of current flow, it has disadvantages which are avoided by the cell according to the present invention.

One of these disadvantages is that the solubility of the bipyridinium compound used is lower by a factor of 10 than the minimum solubility required to obtain a high concentration of the substance in the medium and hence to enable a high-contrast image to be formed in a very short time.

In addition, in the known cell the redox potential at which the pyridinium compound takes up one electron with the formation of a green-coloured radical cation salt differs by only 0.2 volt from the potential at which the compound takes up a second electron and is converted into a substantially colourless substance. Consequently the voltage applied across the electrodes is allowed to vary within very narrow limits only, with the result that this factor also seriously limits the speed at which an image can be formed.

Another reason why in the known cell maintaining the correct potential difference across the electrodes is of importance is that the substantially colourless compound produced by the taking up of two electrons reacts very slowly only with the initial substance with the formation of the radical cation salt.

Another disadvantage of the known cell is that the display electrode is not homogeneously coloured but the colouring is greatly dependent upon the shape and disposition of the anode.

The image display cell according to the invention which avoids all the said disadvantages is characterized in that the reversibly reducible redox substance either is a compound of the formula 1

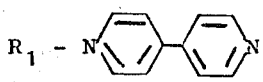 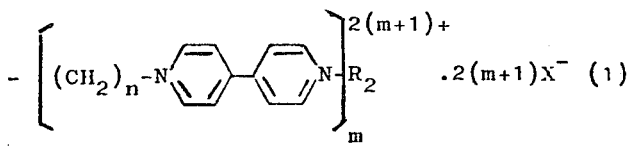

where $m = 0$, in which case $R_1$ and $R_2$ represent a linear or branched alkyl, alkenyl, alcoxycarbonylalkyl or phenylalkyl group containing up to 10 carbon atoms which may be substituted with a halogen or nitrile, or a morpholinocarbonylmethyl group in which the morpholino group may be substituted with one or two methyl groups, and $X^-$ represents a monovalent anion selected from the group comprising $ClO_4^-$, $BF_4^-$, $NO_3^-$, $Cl^-$, $Br^-$, $F^-$ and $C_6H_5SO_3^-$ so, that the solubility of the substance in water exceeds $10^{-2}$ mol/l and the solubility product in water of the radical cation salt formed by reduction of the compound is less than 5 times $10^{-5}$ (concentrations in mol/l), or $m = 1$, in which case $R_1$ and $R_2$ are the same and each represent an alkyl group containing from 1 to 5 carbon atoms or a benzyl group and $n = 4$, $X^-$ represents a $ClO_4^-$ ion, if $R_1$ and $R_2$ represent an alkyl group containing from 1 to 3 carbon atoms, or a $BF_4^-$ ion, if $R_1$ and $R_2$ represent an alkyl group containing from 2 to 5 carbon atoms or a benzyl group, or $m = 2$ or 3, in which case $n = 4$ and $R_1$ and $R_2$ each represent an ethyl or propyl group and $X^-$ represents a $BF_4^-$ or $ClO_4^-$ ion, or the reversibly reducible redox substance is the reaction product of 4,4'-bipyridyl and an α,ω-dibromoalkane containing from 4 to 7 carbon atoms, obtained in a polar aprotic solvent at temperatures between room temperature and the boiling point of the mixture, and the reversibly oxidizable redox substance is an alkali metal bromide or quaternary ammonium bromide having a minimum solubility of $10^{-2}$ mol/l as far as the cation of the bromide does not precipitate with the anion of the reducible redox substance.

One skilled in the art will know which of the cations used precipitate with perchlorate or borontetrafluoride ions. In general this is not the case with lithium, sodium and quaternary ammonium ions.

It should be mentioned that compounds of the formula 1 in which $m = 0$ are also used in the image display cell described in non-prepublished Netherlands Pat. application No. 7,117,713 (PHN.6063). According to said Netherlands Pat. application, however, the reversibly oxidizable substance is not a bromide, as in the present invention, but the radical cation salt produced by reduction of a compound of the formula 1. A disadvantage of the relevant cell is the complexity of assembly, similarly to what was mentioned above with respect to an embodiment of the cell described in Netherlands Pat. application No. 7,116,637.

The structure of the reaction product of α,ω-dibromo-alkane and bipyridyl is not known. It may be assumed that the structure of a part of the reaction product can be represented by the formula 1 in which $n = 4$ to 7, $X^- = Br^-$ and $R_1$ and/or $R_2$ represent an ω-bromoalkyl group. Attempts to determine the value of $m$ by determining the amount of covalently bound bromine in the reaction product yielded values of a magnitude such that it must be assumed that part of the reaction product consists of compounds having a cyclic structure.

The compounds of the formula 1 in which $m = 2$ or 3 are novel compounds. Hence the invention also relates to these compounds and to their preparation. The compounds are obtainable by methods known for synthesizing such compounds and by analogous methods.

For example, the compounds of the formula 1 in which $m = 2$ are obtainable by reacting a compound of the formula 2

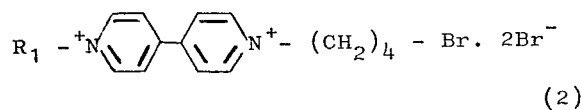

(2)

with a compound of the formula 3

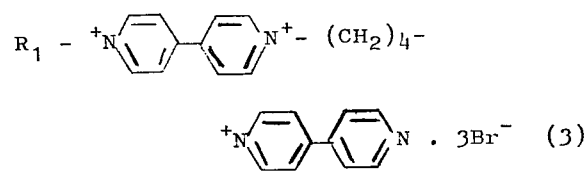

. 3Br⁻ (3)

Compounds of the formula 1 in which $m = 3$ are obtainable by reacting a compound of the formula 3 with a compound of the formula 4

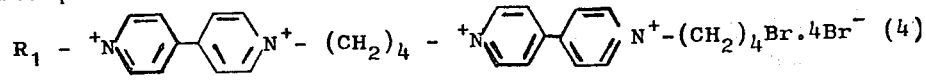

Compounds of the formula 2 are obtainable by reacting N-ethyl of N-propyldipyridylbromide with 1,4-dibromobutane, whilst a reaction of a compound of the formula 2 with bipyridyl yields a compound of the formula 3. Compounds of the formula 4 are obtained by reacting a compound of the formula 3 with 1,4-dibromobutane.

All the above reactions are performed in a polar aprotic solvent at temperatures which lie between room temperature and the boiling point of the reaction mixture.

Examples of polar aprotic solvents are dimethylformamide, acetonitrile, sulfolane, dimethylsulfoxide, propylenecarbonate and the like.

It is of essential importance for the cell according to the invention that the compounds of the formula 1 are satisfactorily soluble in the medium so that the medium contains sufficient substance for fast image formation. On the other hand, it is of particular importance for the reduction product formed at the display electrode to be hardly soluble in the medium so that the contrast of the image is not reduced by diffusion of the coloured compound to the medium.

Compounds of the formula 1 in which $m = 0$ satisfy the above requirements by a suitable combination of the substituents $R_1$ and $R_2$ and the anion $X^-$.

It was found that the solubility of these compounds in water increases as $R_1$, $R_2$ and $X^-$ are smaller. It was also found that the solubility product of the reduction products of the said compounds decreases as $R_1$, $R_2$ and $X^-$ are greater.

A branched alkyl group $R_1$ or $R_2$ causes a compound of the formula 1 to have a lower solubility and the reduction product obtained from it to have a smaller solubility product than a straight-chain alkyl group containing the same number of carbon atoms.

If $R_1$ and $R_2$ represent alkyl groups, the following combinations of $R_1$, $R_2$ and $X^-$ may be chosen:

| $R_1$ and $R_2$ | $X^-$ |
|---|---|
| $C_1 - C_6$ | $ClO_4^-$ |
| $C_1 - C_7$ | $BF_4^-$ |
| $C_5 - C_9$ | $Br^-$ |
| $C_6 - C_8$ | $NO_3^-$ |
| $C_6 - C_9$ | $Cl^-$ |
| $C_6 - C_{10}$ | $F^-$ |

In the case of an anion $X^-$, as a rule an alkenyl group is chosen which has the same number of carbon atoms as, or 1 carbon atom more than, the alkyl group which is combined with said anion.

In general, an alkoxycarbonylalkyl group when combined with a given anion $X^-$ has one carbon atom less than an alkyl group combined with said anion $X^-$.

As a rule, a phenylalkyl group is chosen so as to have two carbon atoms more than an alkyl group.

If a group $R_1$ or $R_3$ carries a nitrile group, the carbon skeleton of $R_1$ or $R_2$ may as a rule contain two carbon atoms less than an unsubstituted group.

If a group $R_1$ or $R_2$ carries a halogen atom, the number of carbon atoms of the group may in general be equal to that of an unsubstituted group.

A compound used in the cell according to the invention as a reversible reducible substance (hereinafter also referred to as a viologen) at the cathode is converted into a blue-coloured radical cation by taking up an electron. The number of electrons which a compound can take up from the electrode is equal to the number of bipyridyl groups contained in the molecule.

Compounds of the formula 1 in which $m = 0$ occupy a particular position amongst the reversibly reducible compounds used according to the invention, because when reduced they form a non-porous film on the electrodes which can be erased at a particularly high rate even with potentiostatic control.

The bromine formed from bromide at the anode, combined with a quaternary ammonium bromide, is deposited on the anode as an insoluble salt.

The image display cell according to the invention has a casing at least one wall or wall portion of which is transparent, as to allow for the visual perception of an image formed. It may be made from a synthetic material, a glass or the like.

The electrodes may consist of stannic oxide, indium oxide, platinum, palladium, gold and other inert electrode materials. Obviously it is not necessary for all the electrodes to be made of the same material. The electrodes may alternatively consist of carbon. If the image is to be visually perceptible, a carbon electrode cannot be used as the display electrode because the colour is not perceptible against a black background.

The electrodes may be formed in a variety of shapes. Also more than one anode and/or cathode may be used.

The image produced may have the same shape as the surface of the display electrode or as the visible part of this surface. When a transparent electrode is used as the display electrode, it may be deposited on the inner surface of the transparent wall of the casing. Part of the electrode may be coated with an electrically non-conducting material, for example a synthetic material, in which case the image will have the same shape as the uncoated part of the electrode surface. As an alternative, part of the wall of the cell may be screened by an external opaque mask, in which case the image produced has the same shape as the visible part of the display electrode.

The display electrode may alternatively be applied to the rear wall of the casing so that the image is viewed through the transparent wall and the cell liquid. However, it is not necessary for the image electrode to be disposed on a wall of the casing, but it may also be disposed at another location where it is surrounded by the cell liquid. In this case it may be preferably for the rear surface of the electrode to be coated with an electrically non-conducting material.

If the image is to be viewed from two directions, the display electrode may advantageously be located inside the cell not in contact with a wall because thus — in the case of a flat electrode — an image is produced on both major surfaces.

Because in the cell according to the invention the coloured substance adheres to the electrode and does not disperse in the cell contents by diffusion, the colour formed may rapidly be removed by reversing electrode polarity. This provides the important advantage that the response is not determined by the spacing between the anode and the cathode. Consequently the position of the anode relative to the cathode may be chosen at will. The anode may, for example, be at an angle of 90° to the cathode or be co-planar with it.

In the above an image has been referred to which has the same shape as (the visible part of) the display electrode, but obviously the image may alternatively be built up from a number of components which are provided by an equal number of display electrodes of the cell which are rendered operative.

If the or each display electrode is disposed on a transparent wall of the cell, the contrast of the image may be increased by dispersing an insoluble, for example white, substance in the cell liquid. Suitable such substances are titanium oxide and barium sulfate.

The cell according to the invention may be used not only for displaying images but also as a voltage indicator. If a voltage higher than the minimum voltage of about 1.5 volts required to cause the cell to respond is, or has been, set up across the electrodes, colour is observed on the display electrode.

A signal may, however, be observed by other than visual means. Since in the formation of colour the surface of the electrode is coated with a viologen radical, the potential of the electrode relative to the cell liquid changes. This change in potential can be observed by means of a reference electrode.

Even if the amount of electrical charge which has passed through the cell is not enough to form an amount of colouring substance sufficient to be visually perceptible, the change in potential of the electrode relative to the cell liquid can be observed by means of a reference electrode.

Hence the cell may be used as a means of recording that a voltage has been set up across the electrodes, causing a small amount of charge to pass through the cell, in other words, the cell may be used as a storage element. Obviously in such use of the cell the transparent wall portion of the cell need not be optically transparent.

Reference electrodes may be made of the same materials as the display electrodes, however, as an alternative glass electrode, calomel electrodes and the like may be used.

Reference electrodes may also be used to reduce to a minimum the time required for the formation of the image. If a comparatively high potential difference is set up across a cathode and an anode of a cell, the viologen in the vicinity of the cathode will rapidly be reduced. Further increase of the amount of reduced viologen at the cathode will then depend upon the rate at which viologen from the medium is conveyed to the cathode. However, side reactions, for example the formation of hydrogen, may occur, and this is undesirable.

To prevent such side reactions the potential difference across the electrodes is chosen so that a sufficient amount of viologen always can diffuse to the cathode. Thus the rate at which initially colouring matter is formed on the cathode is lower than in the above case.

If a reference electrode disposed near the cathode is used, the advantage of a rapid reaction due to a large potential difference may be combined with the advantage provided by the use of a smaller potential difference in that side reactions are prevented. The potential difference produced across the cathode and the reference electrode by the application of a potential difference across the cathode and the anode may continuously be compared with a potential difference which is lower than, or equal to, the maximum permissible potential difference between the cathode and the reference electrode. If, for example, the measured potential difference is greater, the potential difference across the cathode and the anode may be reduced until the desired potential difference across the cathode and the reference electrode is reached.

In general the image display cell is operated with a potential difference between 1.5 volts and 10 volts across the display electrode and the counter electrode. As a rule a potential difference between 1.5 volts and 4 volts is applied.

A visually perceptible image will as a rule be obtained in about 0.01 second.

The concentration of the viologen in the cell liquid will usually be between 0.01 and 0.2 equivalent/litre. In this connection, an equivalent of viologen means an amount of viologen which contains the same number of bipyridyl groups as a mole of bipyridyl.

Some of the compounds of the formula 1 in which $m = 0$ are known. They are obtainable by coupling bipyridyl with a halide by means of a Menskhutkin reaction. The preparation of a number of compounds was described inter alia by Michaelis in J. Gen. Physiol. Vol. 16, 859 (1933).

The resulting halides may simply be converted into other salts. For example, the addition of silver surfate enables silver halide to be precipitated, a solution of the viologen sulfate being obtained. From this, for example, barium sulfate may be precipitated by the addition of a barium salt, for example barium nitrate, a solution of viologen nitrate being obtained.

The compounds of the formula 1 in which $m = 1$ are described in U.K. Pat. No. 1,054,397.

The concentration of the alkali metal or quaternary ammonium bromide, for example tetraalkyl ammonium bromide, contained by the cell as a reversibly oxidizable substance is of the same order of magnitude as that of the viologen compound. In order not to retard operation of the cell, as a rule the concentration will be made at least equal to that of the viologen compound.

The invention will now be described more fully with reference to the following Examples.

EXAMPLES

1. A glass cuvette, two opposed walls of which were internally coated with an $SnO_2$ electrode, was rinsed with nitrogen for 24 hours. The surface area of either electrode was 1.5 cm², the electrode spacing was 1 cm. The resistance of the $SnO_2$, which was measured by applying a voltage to two conductive strips provided along two opposite sides of an electrode, was 10 ohms. The cell was filled with an oxygen-free solution of tetramethylene bis[4(1-ethylpyridin-4-yl)pyridinium] tetraborofluoride (0.05 mol/litre) and NaBr (0.05 mol/litre) in water which previously had been boiled out whilst passing through nitrogen.

A direct voltage of 2.5 volts was applied across the electrodes for 250 milliseconds. As a result the cathode was coloured violet. The bromine formed at the anode precipitated as $Br_3^-$ together with the tetramethylene bis[4(1-ethyl-pyridin-4-yl)pyridinium] ion on the anode.

After no voltage had been applied to the cell for 1 minute, a voltage of reversed polarity was applied for 250 milliseconds, with the result that the coloured electrode was decolourized.

2. Example (1) was repeated with the difference that a direct voltage of 2.5 volts was applied for 500 milliseconds. After 1 hour the coloured electrode was decolourized by applying a voltage of reversed polarity for 500 milliseconds.

3. Example (1) was repeated with the same result, using a cell, a side wall and part of the front wall of which were coated with $SnO_2$ electrodes.

4. Example (1) was repeated with the difference that the cell was filled with an aqueous solution of tetramethylene bis[4(1-ethylpyridin-4-yl)pyridinium] tetraborofluoride (0.05 mol/litre) and tetramethylammoniumbromide (0.05 mol/litre).

5. Example (1) was repeated, using aqueous solutions of each of the compounds mentioned in Table I and of NaBr (0.05 mol/litre).

TABLE I

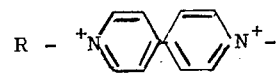

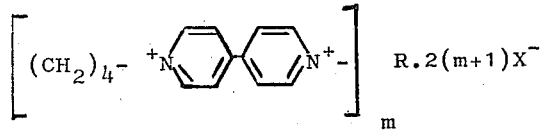

| R | m | X | conc.mol/litre |
|---|---|---|---|
| $CH_3$ | 1 | $ClO_4$ | 0.05 |
| $C_2H_5$ | 1 | $ClO_4$ | 0.05 |
| $C_2H_5$ | 1 | $BF_4$ | 0.05 |
| $C_3H_7$ | 1 | $ClO_4$ | 0.05 |
| $C_3H_7$ | 1 | $BF_4$ | 0.05 |
| $C_4H_9$ | 1 | $BF_4$ | 0.05 |
| $C_5H_{11}$ | 1 | $BF_4$ | 0.05 |
| $C_6H_5CH_2$ | 1 | $BF_4$ | 0.05 |
| $C_2H_5$ | 2 | $BF_4$ | 0.05 |
| $C_2H_5$ | 3 | $BF_4$ | 0.05 |
| $C_2H_5$ | 2 | $ClO_4$ | 0.02 |
| $C_2H_5$ | 3 | $ClO_4$ | 0.02 |
| $C_5H_{11}$ | 0 | Br | 0.05 |
| $C_6H_{13}$ | 0 | Br | 0.05 |
| $C_7H_{15}$ | 0 | Br | 0.05 |
| $C_6H_5CH_2$ | 0 | Br | 0.05 |

6. Example (1) was repeated with a difference that the cell was filled with an aqueous solution of tetramethylene bis[4(1-benzylpyridin-4-yl)pyridinium] tetraborofluoride (0.04 mol/litre) and tetrabutylammoniumbromide (0.04 mol/litre).

7. Example (1) was repeated with the difference that a direct voltage of 3 volts was applied for 100 milliseconds. Then an equal voltage with reversed polarity was applied for an equal period.

8. Example (1) was repeated with the difference that the $SnO_2$ electrodes were replaced by $In_2O_3$ electrodes with a sheet resistance of 5 ohms.

9. Example (1) was repeated with the difference that the cell was filled with an aqueous solution of NaBr (0.05 mol/litre) and a polymeric quaternized bipyridyl compound (0.05 equivalent/litre) obtained by reacting 1,4-dibromobutane and 4,4'-bipyridyl in a polar aprotic solvent.

10. Example (1) was repeated with the difference that the quaternized polymeric bipyridyl compound was produced from bipyridyl and one of the following α,ω-dibromoalkanes:
   a. 1,5-dibromopentane
   b. 1,6-dibromohexane
   c. 1,7-dibromoheptane.

11. Example (1) was repeated with aqueous solutions of (formula 1; $m = 0$)

| $R_1$ | $R_2$ | $X^-$ |
|---|---|---|
| $n.C_3H_7$ | $n.C_3H_7$ | $ClO_4^-$ |
| I)$C_3H_7$ | $i.C_3H_7$ | $BF_4^-$ |
| $i.C_3H_7$ | $i.C_3H_7$ | $ClO_4^-$ |
| $n.C_4H_9$ | $n.C_4H_9$ | $BF_4^-$ |
| $n.C_4H_9$ | $n.C_4H_9$ | $ClO_4^-$ |
| $n.C_5H_{11}$ | $n.C_5H_{11}$ | $Br^-$ |
| $n.C_5H_{11}$ | $n.C_5H_{11}$ | $BF_4^-$ |
| $CH_3$ | $CH_3$ | $ClO_4^-$ |
| $C_2H_5$ | $C_2H_5$ | $ClO_4^-$ |
| $n.C_5H_{11}$ | $n.C_5H_{11}$ | $ClO_4^-$ |
| $3-CH_3C_4H_8$ | $3-CH_3C_4H_8$ | $BF_4^-$ |
| $3-CH_3C_4H_8$ | $3-CH_3C_4H_8$ | $Br^-$ |
| $n.C_6H_{13}$ | $n.C_6H_{13}$ | $ClO_4^-$ |
| $n.C_6H_{13}$ | $n.C_6H_{13}$ | $BF_4^-$ |
| $n.C_6H_{13}$ | $n.C_6H_{13}$ | $Br^-$ |
| $n.C_6H_{13}$ | $n.C_6H_{13}$ | $Cl^-$ |
| $n.C_6H_{13}$ | $n.C_6H_{13}$ | $F^-$ |
| $n.C_7H_{15}$ | $n.C_7H_{15}$ | $BF_4^-$ |
| $n.C_7H_{15}$ | $n.C_7H_{15}$ | $Br^-$ |
| $n.C_7H_{15}$ | $n.C_7H_{15}$ | $Cl^-$ |
| $n.C_7H_{15}$ | $n.C_7H_{15}$ | $F^-$ |
| $n.C_7H_{15}$ | $n.C_7H_{15}$ | $NO_3^-$ |
| $n.C_7H_{15}$ | $n.C_7H_{15}$ | $C_6H_5SO_3^-$ |
| $n.C_8H_{17}$ | $n.C_8H_{17}$ | $Br^-$ |
| $n.C_8H_{17}$ | $n.C_8H_{17}$ | $Cl^-$ |
| $C_6H_5CH_2$ | $C_6H_5CH_2$ | $Br^-$ |
| $C_6H_5C_3H_6$ | $C_6H_5C_3H_6$ | $Br^-$ |
| $n.C_5H_{11}$ | $n.C_7H_{15}$ | $Br^-$ |
| $n.C_5H_{11}$ | 3.5-dimethyl-morpholino-carbonylmethyl | $BF_4^-$ |
| 3,5-dimethyl-morpholino-carbonylmethyl | 3,5-dimethyl-morpholino-carbonylmethyl | $BF_4^-$ |

Figure 2A:
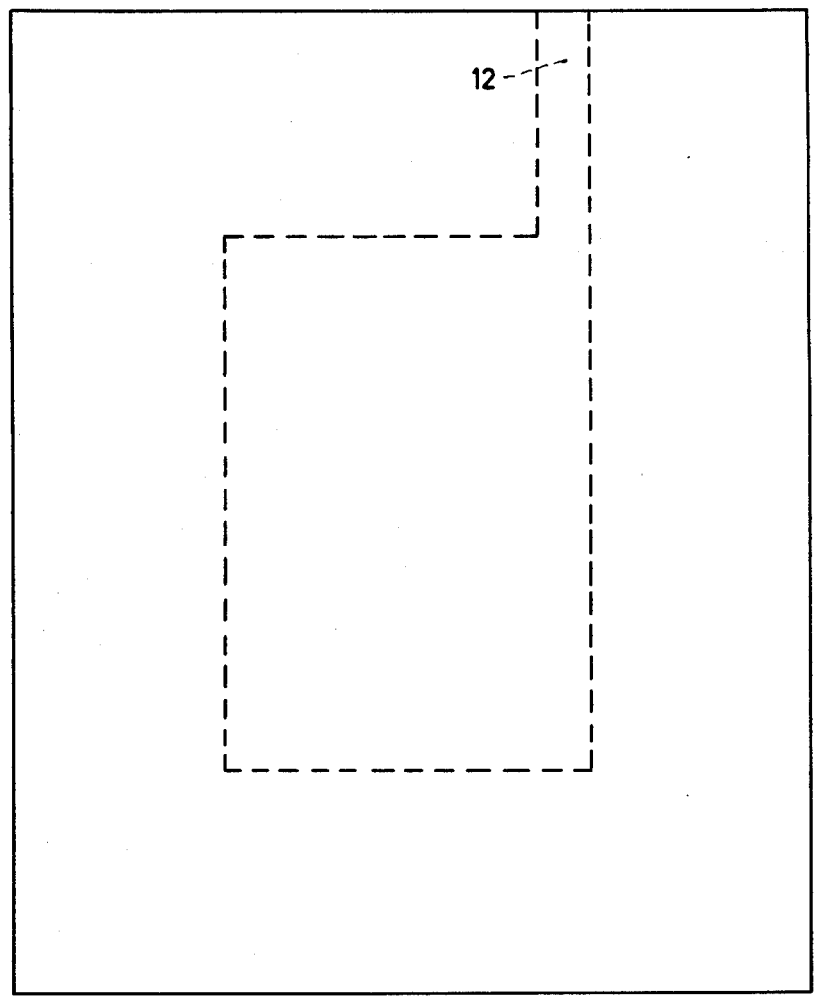
Figure 2:
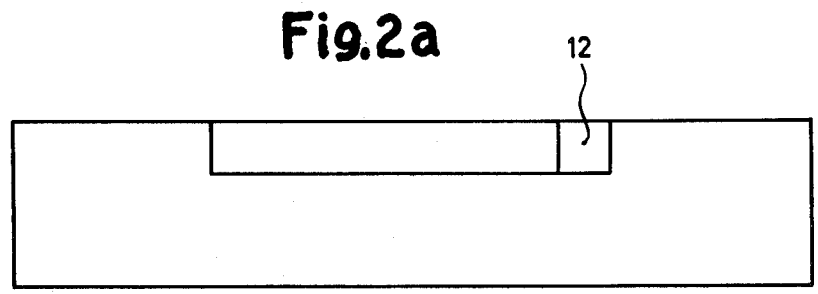

12. Grooves having a depth of 0.4 mm and a width of 0.1 mm were formed according to the pattern shown in FIG. 1 in a nickel plate 0.5 mm thick. A nickel wire was welded to each resulting segment. The plate was then placed in a mould which was filled with a synthetic resin in an amount such that the grooves were filled with the resin and the attached wires protruded from the resin. After the resin had hardened the assembly was ground until so much nickel and resin were removed from the plate that the segments were electrically disconnected from one another. The plate was polished and then coated with a layer of gold by electrodeposition. A transparent plate of Perspex formed with a recess as shown in FIGS. 2 and 2A was cemented to the plate. The cell was filled through the recess 12 with the same solutions as described in Example (1), after which the opening 12 was closed with a Perspex stopper and then sealed with a cement. The segments designated by the reference numerals 1 to 7 were the display electrodes, electrodes 8 to 10 were the reference electrodes and electrode 11 was the counter electrode. For the operation of the cell a circuit arrangement was used which compares the voltage set up between the display electrodes and one of the reference electrodes with a given signal voltage and which so controls the current flowing through the counter electrode and the display electrodes that the measured voltage becomes equal to the signal voltage. At a signal voltage of 1 volt all the operative display electrodes were coloured a deep purple after 0.01 second, whereupon the voltage was removed from the display electrodes.

Figure 3:
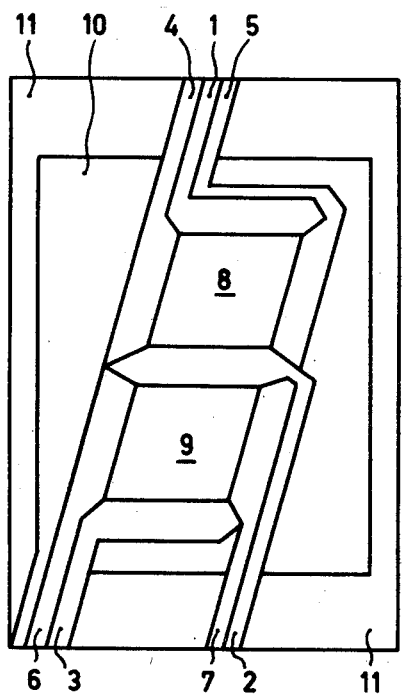
Figure 4:
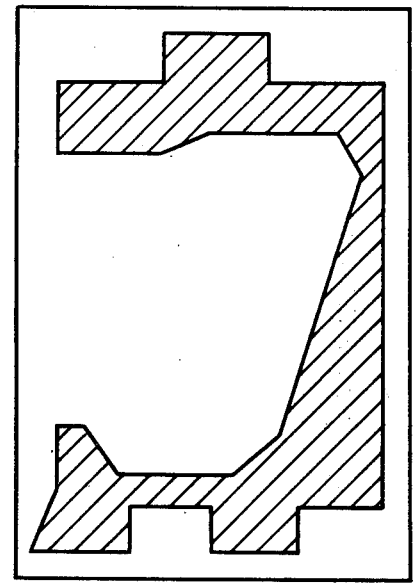

13. A Perspex substrate was coated with a film of gold by vapour deposition. The pattern of FIG. 3 was then etched in the film. Part of the film (the part shown shaded in FIG. 4) was coated with an electrically insulating transparent lacquer. Subsequently a cell was constructed and operated in the manner described in Example (12).

14. A nickel plate was provided with grooves in the manner described in Example (12) with the difference that instead of the figure 8 a hole of 10 mm × 15 mm was formed at the centre. Into this hole 25 platinum wires were inserted at right angles to the plate surface to serve as display electrodes. The assembly was embedded in resin, ground and polished in the manner described in Example (12). Electrodes 10 and 11 were coated with a film of gold. The cell was then finished and operated in the manner described in Example (12), with the difference that the operative electrodes were switched off after only 100 μs. By means of a high-resistance voltmeter (input impedance > 1 MΩ) it was possible to detect which electrodes had been turned on and which had not. In the first case a voltage difference of 90 millivolts was measured between the reference electrode 10 and the relevant display electrode, whereas in the second case no voltage difference was found. The information stored in this manner can be erased in less than 100 μs.

What is claimed is:

1. Image display cell having a transparent wall part and containing an aqueous solution of an N.N′-disubstituted-4,4′-bipyridinium salt as a reversibly reducible redox substance and of a halide as a reversibly oxidizable redox substance, which solution is in contact with at least two inert electrodes, characterized in that the reversibly reducible redox substance either is a compound of the formula 1

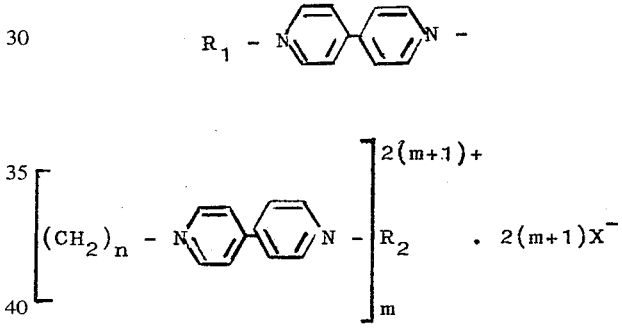

where $m = 0$, in which case $R_1$ and $R_2$ represent a linear or branched alkyl, alkenyl, alkoxycarbonylalkyl or phenylalkyl group containing up to 10 carbon atoms which may be substituted with a halogen or a nitrile, or a morpholinocarbonylmethyl group in which the morpholino group may be substituted with one or two methyl groups, and $X^-$ is a monovalent anion selected from the group comprising $ClO_4^-$, $BF_4^-$, $NO_3^-$, $Cl^-$, $Br^-$, $F^-$ and $C_6H_5SO_3^-$ so, that the solubility of the substance in water exceeds $10^{-2}$ mol/litre and the solubility product in water of the radical cation salt formed by reduction of the compound is less than 5 times $10^{-5}$ mol/liter, or $m = 1$, in which case $R_1$ and $R_2$ have the same meanings and each represent an alkyl group containing from 1 to 5 carbon atoms or a benzyl group, and $n = 4$, $X^-$ represents a $ClO_4^-$ ion if $R_1$ and $R_2$ each represent an alkyl group containing from 1 to 3 carbon atoms, or a $BF_4^-$ ion, if $R_1$ and $R_2$ each represent an alkyl group containing from 2 to 5 carbon atoms or a benzyl group, or $m = 2$ or 3, in which case $n = 4$ and $R_1$ and $R_2$ each represent an ethyl group or a propyl group and $X^-$ represents a $BF_4^-$ or $ClO_4^-$ ion, or the reaction product of 4,4′-bipyridyl and an α, ω-dibromo-alkane containing from 4 to 7 carbon atoms obtained in a polar aprotic solvent at temperatures between room temperature and the boiling point of the mixture,
and that as a reversibly oxidizable redox substance an alkali metal bromide or quaternary ammonium bromide having a minimum solubility of $10^{-2}$ mol/litre is used with the promise that the cation of the bromide does not precipitate with the anion of the reducible redox substance.

2. Image display cell as claimed in claim 1, characterized in that a compound of the formula 1, where $m = 0$, is used as the reversible reducible redox substance.

3. Image display cell as claimed in claim 1 characterized in that each anode is at an angle to each cathode.

4. Image display cell as claimed in claim 1, characterized in that each anode is co-planar with each cathode.

5. Image display cell as claimed in claim 4, characterized in that an insoluble compound is dispersed in the cell liquid.

6. Image display cell as claimed in claim 5, characterized in that the cell has one or more reference electrodes.

* * * * *